United States Patent [19]

Reifenhäuser

[11] Patent Number: 4,797,083
[45] Date of Patent: Jan. 10, 1989

[54] EXTRUSION DIE FOR MAKING A FOAMED THERMOPLASTIC WEB

[75] Inventor: Hans Reifenhäuser, Troisdorf, Fed. Rep. of Germany

[73] Assignee: Reifenhauser GmbH & Co. Maschinenfabrik, Troisdorf, Fed. Rep. of Germany

[21] Appl. No.: 44,892

[22] Filed: Apr. 30, 1987

[30] Foreign Application Priority Data

May 13, 1986 [DE] Fed. Rep. of Germany ....... 3615994

[51] Int. Cl.$^4$ .................. B29C 47/12; B29C 47/90
[52] U.S. Cl. ................. 425/378.1; 264/45.9; 425/381; 425/466; 425/817 C
[58] Field of Search .......... 264/45.9, 46.1, 171, 264/165; 425/4 C, 113, 146, 143, 378 R, 379 R, 380, 376 A, 461–467, 817 C, 378.1, 379.1, 382.4

[56] References Cited

U.S. PATENT DOCUMENTS

| | | | |
|---|---|---|---|
| 3,608,145 | 9/1971 | Baker et al. | 425/4 C |
| 3,764,642 | 10/1973 | Boutillier | 425/4 C |
| 3,792,951 | 2/1974 | Meyers | 425/380 |
| 4,056,344 | 11/1977 | Lemelson | 425/380 |
| 4,201,480 | 5/1980 | Brand | 425/817 C |
| 4,484,883 | 11/1984 | Honda et al. | 425/467 |
| 4,655,704 | 4/1987 | Dekel | 425/461 |
| 4,669,965 | 6/1987 | Murakami | 264/171 |

FOREIGN PATENT DOCUMENTS 1504444 3/1972 Fed. Rep. of Germany ..... 264/46.1
51-15070 5/1976 Japan ................. 425/467

Primary Examiner—Jan H. Silbaugh
Assistant Examiner—Jill L. Heitbrink
Attorney, Agent, or Firm—Herbert Dubno

[57] ABSTRACT

The extrusion press comprises a block and a displacing body mounted in the block. The block includes an inlet duct, two feed ducts connected to it, transversely widened spaces connected to them and an outlet duct. The displacing body comprises a mounting portion and a guide portion and is located downstream of the inlet duct. It separates both feed ducts and both transversely widened spaces and projects with a sword-like piece of the guide portion into the outlet duct to form outlet gaps. It ends upstream of a mouth of the outlet duct providing an inner expansion chamber. The displacing body is free of a supporting member and held fixed from above and below by its mounting portion so that the thermoplastic material flow surrounds the sides of the sword-like piece running in the flow direction and surrounds the sword-like piece. At least the sword-like piece has a tempering passage system distributed over its length and breadth which is connected with a plurality of lateral connecting tubes for feeding and removing a tempering medium upstream of the sword-like piece.

4 Claims, 6 Drawing Sheets

EXTRUSION DIE FOR MAKING A FOAMED THERMOPLASTIC WEB

FIELD OF THE INVENTION

My invention relates to an extrusion die for an extruder used in the fabrication of a thermoplastic web and, more particularly, to an extrusion die for making a thermoplastic foam web used in the fabrication of thermoplastic foam plates or mats.

BACKGROUND OF THE INVENTION

An extrusion die is known comprising a block and a flow-splitting and flow-displacement body mounted in the block. The block has an inlet, two feed passages communicating with the inlet and separated by the flow-displacing body, transversely widened gaps communicating with the passages and an outlet duct.

The flow-splitting and flow-displacement body has a mounting portion and a guide portion and is located downstream of the inlet duct. It separates both feed passages and both transversely widened gaps and projects with a sword-like piece or tongue of the guide portion into the outlet duct to form two outlet gaps. It terminates upstream of the mouth of the outlet duct to define therein an inner expansion chamber. It is understood that the block can have thermal insulation and/or temperature control means for heating or cooling the resin flow.

In practice the known extrusion die has transversely spaced ribs or webs bracing on the flow-splitting and flow-displacement body in the vicinity of the transversely broadened gaps to support it about which the thermoplastic material flows. The supporting ribs produce an undesirable texture in the products and damage the structure of the manufactured thermoplastic foam mats or plates which are frequently found to be unsatisfactory. The extruded structure made with such dies is frequently also impaired by non-uniform foaming also in the edge regions of the thermoplastic foam plate or thermoplastic foam mat.

OBJECTS OF THE INVENTION

It is an object of my invention to provide an improved extrusion die for a thermoplastic foam web which overcomes the above-described drawbacks.

It is another object of my invention to provide an improved extrusion die for making a thermoplastic foam web which has a very uniform satisfactory structure.

It is a further object of my invention to provide an improved extrusion die for a thermoplastic foam web which is not impaired by texturing caused by die non-uniformities and by non-uniform foaming.

SUMMARY OF THE INVENTION

These objects and others which will become more readily apparent hereinafter are attained in accordance with my invention in an extrusion die comprising a block and a flow-splitting and flow-displacement body mounted in the block.

The block includes an inlet, two feed passages connected to it, transversely widened gaps connected to them and an outlet duct. The flow-splitting and flow-displacement body has a mounting portion and a guide portion and is located downstream of the inlet duct. It separates both feed passages and both transversely widened gaps and projects with a sword-like tongue of the guide portion into the outlet duct to form two outlet gaps. It ends upstream of the mouth of the outlet duct providing an inner expansion chamber.

According to my invention the flow-splitting and flow-displacement body is supporting rib-free and is held fixed (clamped) from above and below by its mounting portion so the thermoplastic material flow surrounds the sides of the sword-like tongue running in the flow direction and surrounds the sword-like tongue. At least the sword-like tongue has a temperature-control passage system distributed over its length and breadth which is connected with lateral connecting tubes for feeding and removing a temperature-control medium upstream of the sword-like tongue.

Since the sword-like tongue of the flow-splitting and flow-displacement body is supporting rib-free and is held fixed in the described way, supporting rib-dependent texture can no longer occur. Since the thermoplastic material flow surrounds the flow-splitting and flow-displacement body and also the sides of the flow-splitting and flow-displacement body oriented in the flow direction, the described troublesome edge effects are eliminated.

Both features contribute to the solution of the objects set forth but more is required. I have discovered that to avoid non-uniform foaming and to avoid damage to the edge region a special temperature control is necessary. A temperature control is achieved since the sword-like tongue of the flow-splitting and flow-displacement body has a temperature-control passage system distributed over its length and breadth. Thus there is avoided troublesome temperature gradients in the thermoplastic material during its flow through the outlet gap and its flow into the inner expansion chamber. Because of the described combination of features of my invention I can guarantee that the extruded web will have a very uniform structure which is no longer impaired by detrimental texturing and non-uniform foaming. According to operating requirements, the passage system can either be heated or cooled to control temperature.

Advantageously, the sword-like member has its sides running in the flow direction set back from the lateral walls of the block and forms two lateral gaps whose width corresponds approximately to the width of the outlet gaps.

According to another feature of the invention, which is particularly simple in regard to its manufacture, the temperature-control passage system is provided with a plurality of passages guided on a zig-zag course in the sword-like tongue.

The block can also have lateral interior plates with a plurality of auxiliary passages for the temperature-control medium at least in the vicinity of the sword-like tongue.

In addition, the extrusion die according to my invention can be designed so that the plastic material flowing in the individual feed passages is harmoniously blended in both transversely widened gaps and in the outlet gap or at least the flows have a definite relationship with each other. Since definite ratios can be selected, the extruded web has a very uniform structure and is not troubled by non-uniform foaming.

To provide flow control in conjunction with the features described above, flow control members are positioned in the block in a throttling passage between the transversely widened gaps and the outlet gaps, are supported in the block, and are adjustable with the aid of adjusting elements toward the supporting rib-free flow-splitting and flow-displacement body.

My invention is independent of the number of transversely widened gaps and feed passages. Also the inner expansion chamber is not essential to the concept of my invention.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
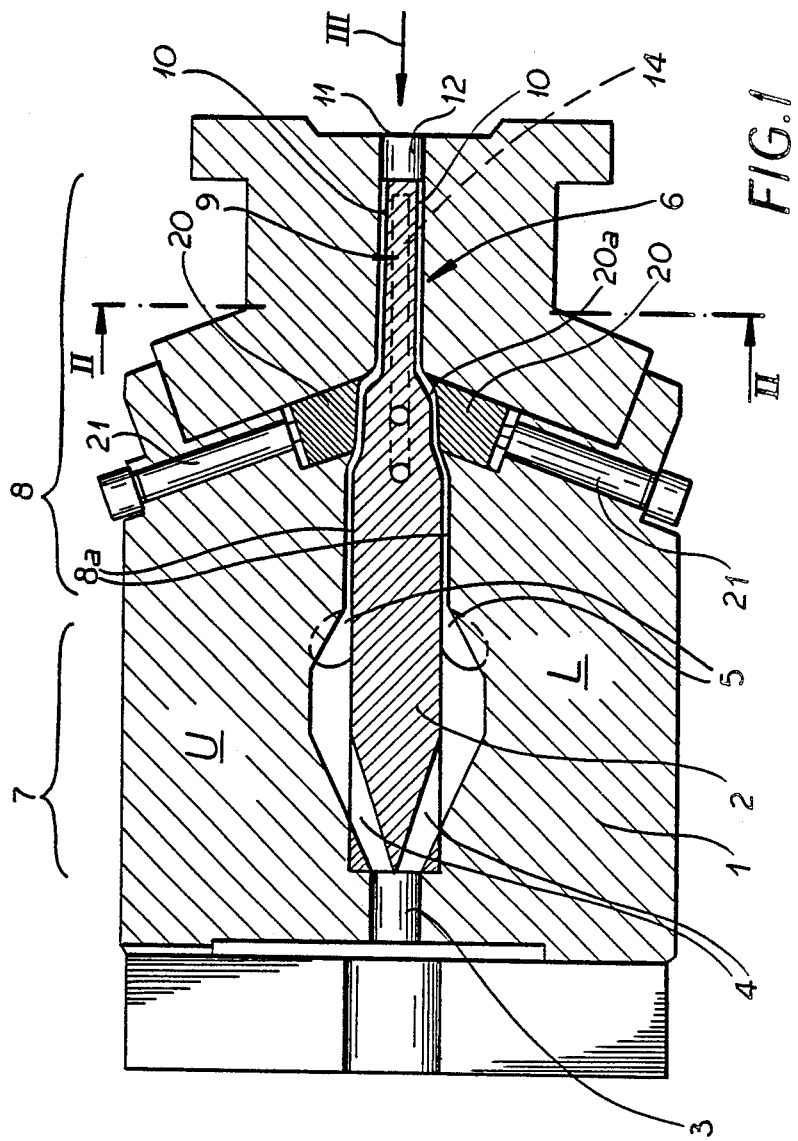
FIG. 1 is a longitudinal cross sectional view through an extrusion die according to my invention.

The extrusion die shown in the drawing is connectable to an extruder (not shown) on the left in FIG. 1. It makes a thermoplastic foam web or strip in the course of manufacture of a thermoplastic foam mat or plate. The die comprises a block 1 and a flow-splitting and flow-displacement body 2 clamped in the block.

The block 1 is assembled using basic construction methods from a plurality of individual components which are however not shown in detail to simplify the illustration of my invention.

The block 1 is provided with an inlet 3, two feed passages 4 connected to the inlet duct and two transversely widened gaps 5 connected to the feed passages 4.

In addition the block has an outlet duct 6.

The flow-splitting and flow-displacement body 2 has a mounting portion 7 as well as a guide portion 8 for feeding the thermoplastic material. The flow-splitting and flow-displacement body 2 is located downstream of the inlet duct 3 in the block 1.

The displacing body 2 separates with its guide portion 8 both feed passages 4 and both transversely widened gaps 5 from each other.

The flow-splitting and flow-displacement body 2 projects with a sword-like tongue 9 of the guide portion 8 into the outlet duct 6 and forms the outlet gaps 10 between the block 1 and the tongue.

The body 2 terminates in the outlet duct 6 upstream of the mouth 11 and thus provides a so-called inner expansion chamber 12 in the outlet duct 6.

The flow-splitting and flow-displacement body 2 is made without supporting ribs so that it is comparatively smooth. It is clamped in place from above and below in its mounting portion 7 in a manner which is not visible in FIGS. 1 to 4 but is described below with reference to FIG. 5.

The sword-like tongue 9 of the flow-splitting and flow-displacement body 2 is surrounded by the thermoplastic flow particularly at its front end. More can be seen in reference to FIGS. 2 and 3.

Figure 4:
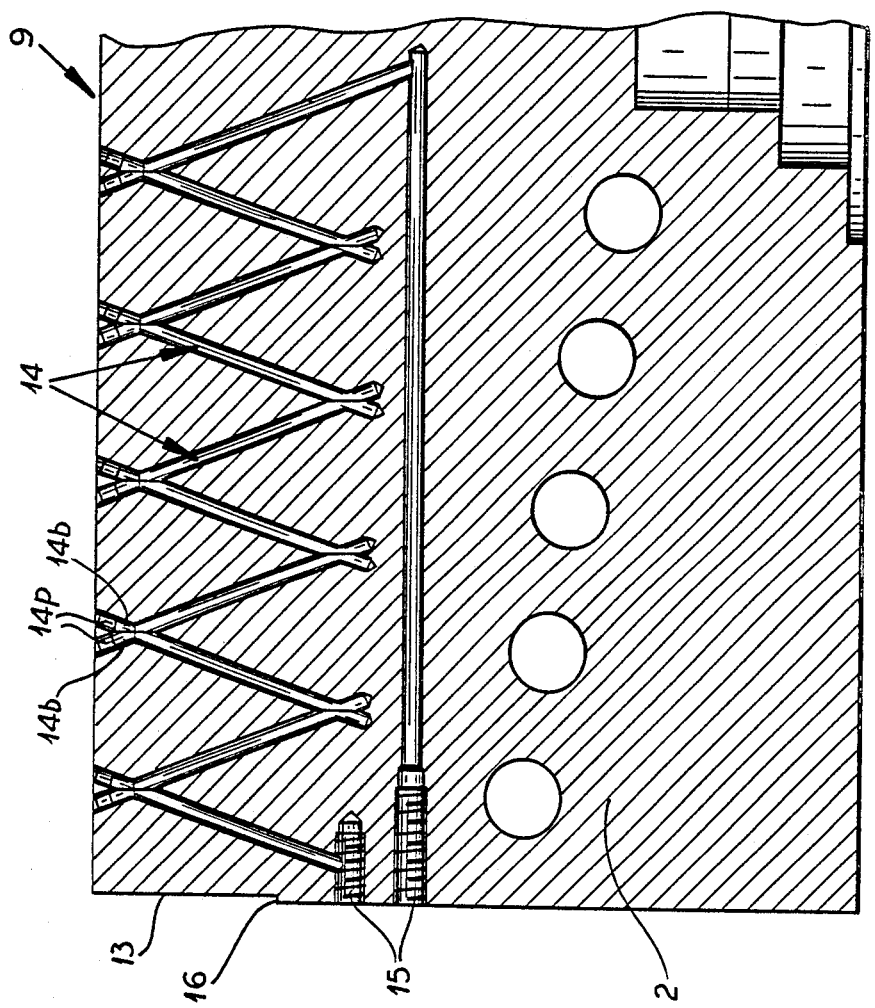
FIG. 4 is an enlarged cross sectional view through the sword-like tongue of the apparatus of FIG. 3 taken along the direction of the longitudinal center line of FIG. 3.

As can be seen from FIG. 4 the sword-like tongue 9 has a temperature-control passage system 14 distributed over its length and width which is connected with lateral connecting tubes 15 upstream of the sword-like tongue 9 for feeding and conducting away a temperature-control medium.

The temperature-control passage system 14 extends upstream beyond the sword-like tongue 9 into the rest of the flow-splitting and flow-displacement body 2. According to the operating conditions, the passage system can either be heated or cooled to control temperature which, if necessary, occurs so that the thermoplastic material entering the inner expansion chamber 12 beyond the outlet gaps 10 no longer experiences troublesome temperature gradients.

In FIG. 4 the sword-like tongue 9 has sides 13 running in the flow direction which are formed by stepping in the side walls of the standard flow-splitting and flow-displacement body 2 by the set back steps 16 so that these sides 13 are set back from the associated lateral interior walls 17 of the block 1 and form lateral gaps 18 whose width corresponds approximately to the width of the outlet gaps 10.

Figure 2:
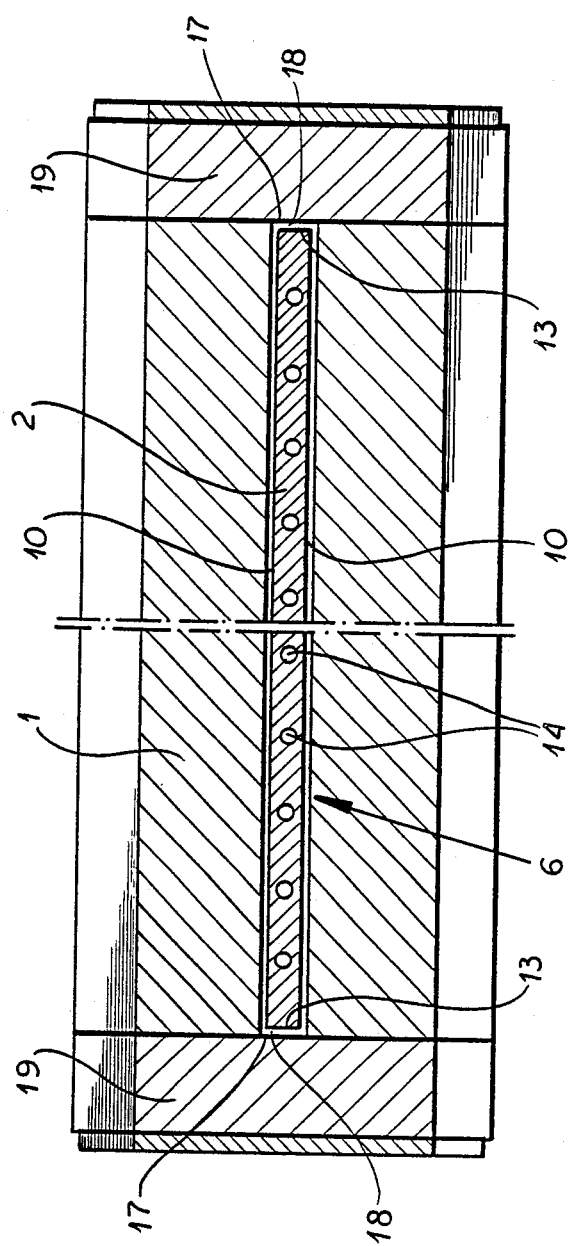
FIG. 2 is a cross sectional view through the apparatus of FIG. 1 taken along line II—II.
Figure 3:
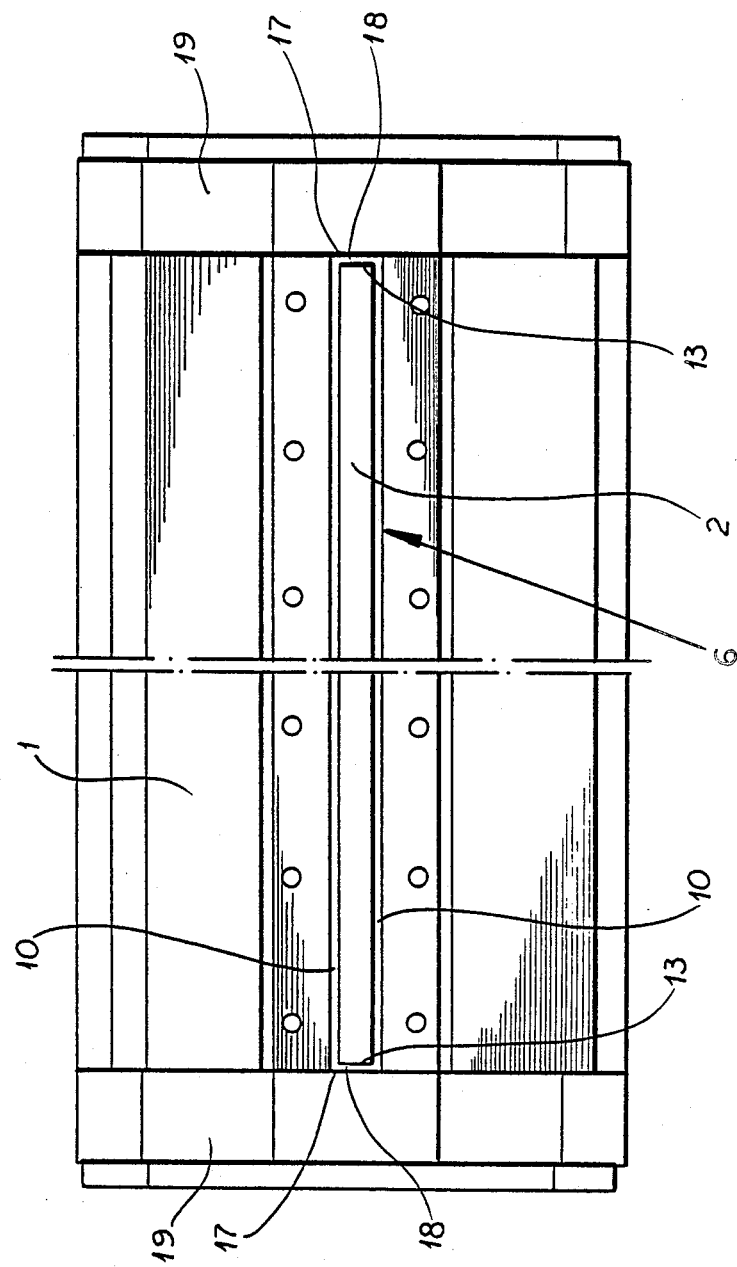
FIG. 3 is a view taken in the direction of the arrow III shown in FIG. 1.

The temperature-control passage system 14 comprises a plurality of passages guided on a zig-zag course as seen in a projection of them on a longitudinal plane of the sword-like tongue 9. Of course the block 1 can have lateral interior plates 19 which form its lateral interior walls 17 in the vicinity of the sword-like tongue 9 as shown in FIGS. 2 and 3. Plugs 14p close the linear bores 14b forming the zig-zag course where the bores meet the edge of the body.

Figure 6:
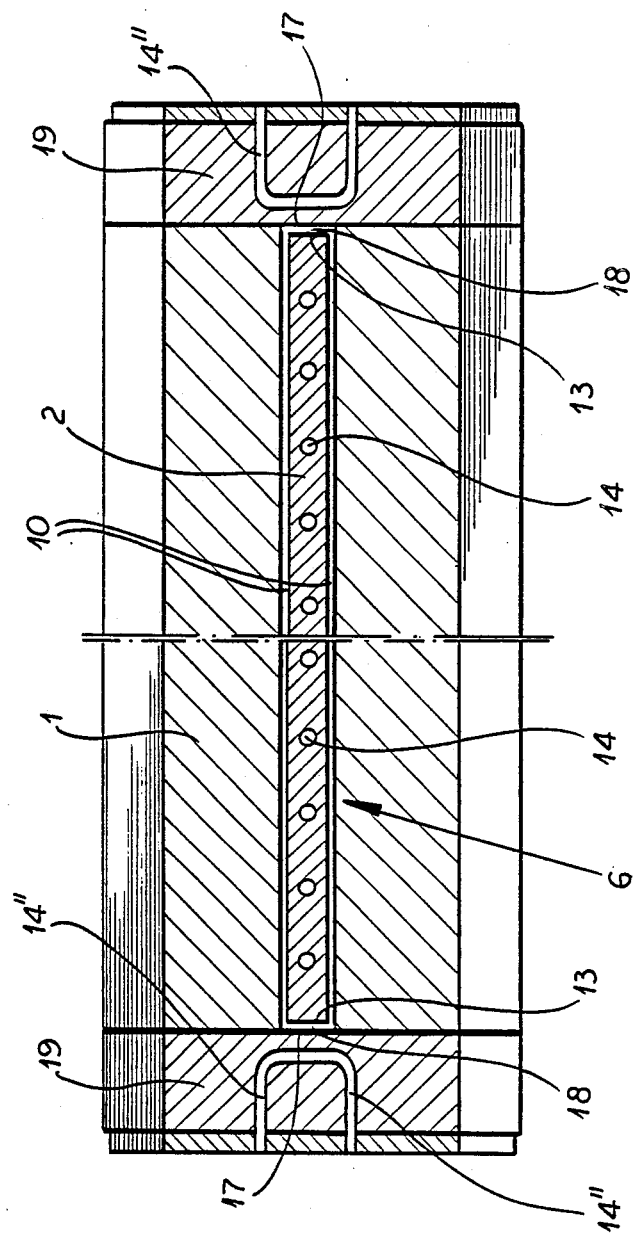
FIG. 6 is a cross sectional view through another embodiment of the extrusion die according to my invention similar to FIG. 2.

Auxiliary temperature-control passages 14" can be provided in the lateral interior plates 19 as shown in FIG. 6. In other respects the embodiment of FIG. 6 is the same as the embodiment of FIG. 1.

In the example of my invention shown in FIG. 1 flow control members 20 are positioned in the throttling passage 20a between the transversely widened gaps 5 and the outlet gaps 10, are supported in the block 1 and are adjustable with the aid of adjusting elements 21. In this way the flow rates in the associated flow ducts can be controlled.

Figure 5:
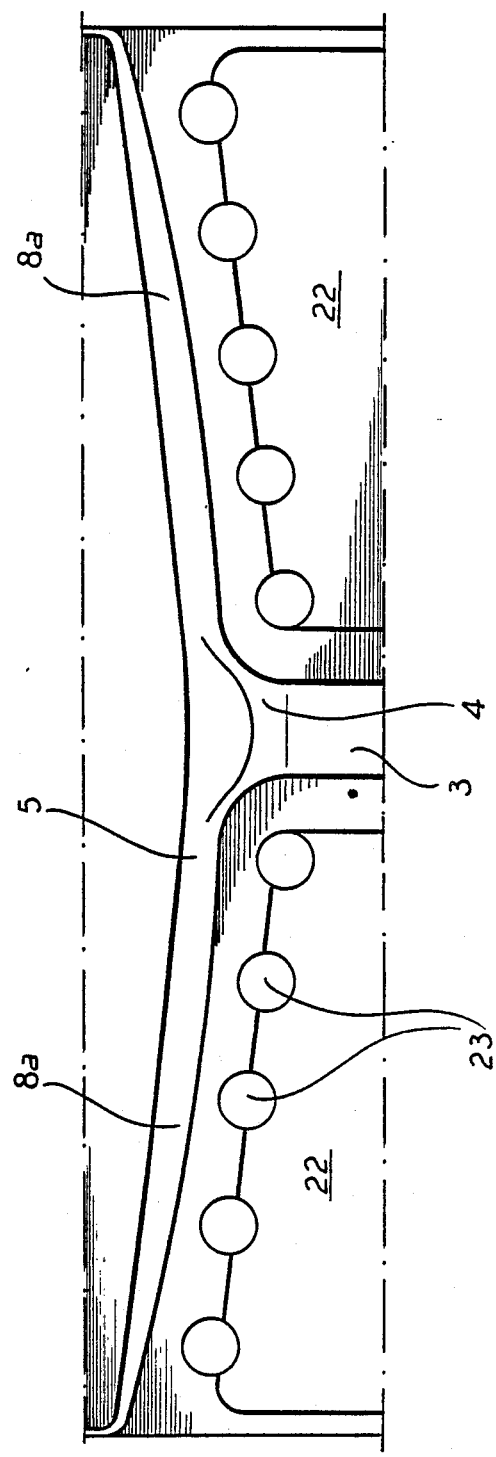
FIG. 5 is a diagrammatic plan view of the flow pattern of the die of FIG. 1 assuming that the top piece of the body has been removed.

In FIG. 5 one sees the inlet duct 3 and the upper portion of the feed passages 4. The feed passages 4 connect to the transversely widened gaps 5 whose upper portion is shown in FIG. 5. The guide portion 8 to which the guide gaps 8a belong connects to these widened gaps 5. Thus the flow-splitting and flow-displacement body 2 is clamped in the region 22 between the upper portion U and the lower portion L of the tool with threaded bolts traversing holes 23 seen in FIG. 5.

I claim:

1. In an extrusion die connectable to an extruder for making a thermoplastic foam web formable into a thermoplastic foam mat or a thermoplastic foam plate comprising a block and a flow-splitting and flow-displacement body in said block, said block including an inlet duct, two feed passages connectable to said inlet duct, two transversely widened gaps connectable to said feed passages and an outlet duct, said flow-splitting and flow-displacement body having a mounting portion and a guide portion, said body being downstream of said inlet duct in said block separating both of said feed passages and said transversely widened gaps with said guide portion and projecting with a sword-like tongue of said guide portion into said outlet duct to form two outlet gaps and an inner expansion chamber upstream of a mouth of said outlet duct, the improvement wherein said flow-splitting and flow-displacement body is plate-like, supporting rib-free and is held fixed from above and below by said mounting portion, said sword-like tongue of said body has sides running in a flow direction of a thermoplastic feed, said sides being set back from lateral interior walls of said block to form two lateral gaps whose width corrresponds approximately to a width of said outlet gaps, said thermoplastic material surrounding said sides of said sword-like tongue, said feed passages extend from said mounting portion to said guide portion, a plurality of flow control members positioned in said block in a throttling passage between said transversely widened gaps and said outlet gaps, said flow control members supported in said block and adjustable with the aid of an adjusting element toward said flow-splitting and flow-displacement body, and at least said sword-like tongue of said flow-splitting and flow-displacement body has a temperature-control passage system distributed over the length and breadth of said sword-like tongue which is connected with a plurality of lateral connecting tubes for feeding and removing a temperature-control medium upstream of said sword-like tongue.

2. The improvement according to claim 1 wherein said temperature-control passage system is provided with a plurality of passages in a zig-zag course in said sword-like tongue.

3. The improvement according to claim 1 wherein said block has a plurality of lateral interior plates with a plurality of auxiliary passages for said temperature-control medium at least in the vicinity of said sword-like tongue.

4. The improvement defined in claim 1 wherein said tongue terminates upstream of an end of said outlet duct to define an inner expansion chamber therein.

* * * * *